Nov. 6, 1962 L. B. JOHNSTON 3,061,914
APPARATUS FOR WITHDRAWING MANDRELS FROM TUBULAR BODIES
Filed Nov. 24, 1958 4 Sheets-Sheet 1

INVENTOR.
LOWELL B. JOHNSTON
BY
ATTORNEYS

Nov. 6, 1962 L. B. JOHNSTON 3,061,914
APPARATUS FOR WITHDRAWING MANDRELS FROM TUBULAR BODIES
Filed Nov. 24, 1958 4 Sheets-Sheet 2

INVENTOR.
LOWELL B. JOHNSTON
BY
ATTORNEYS

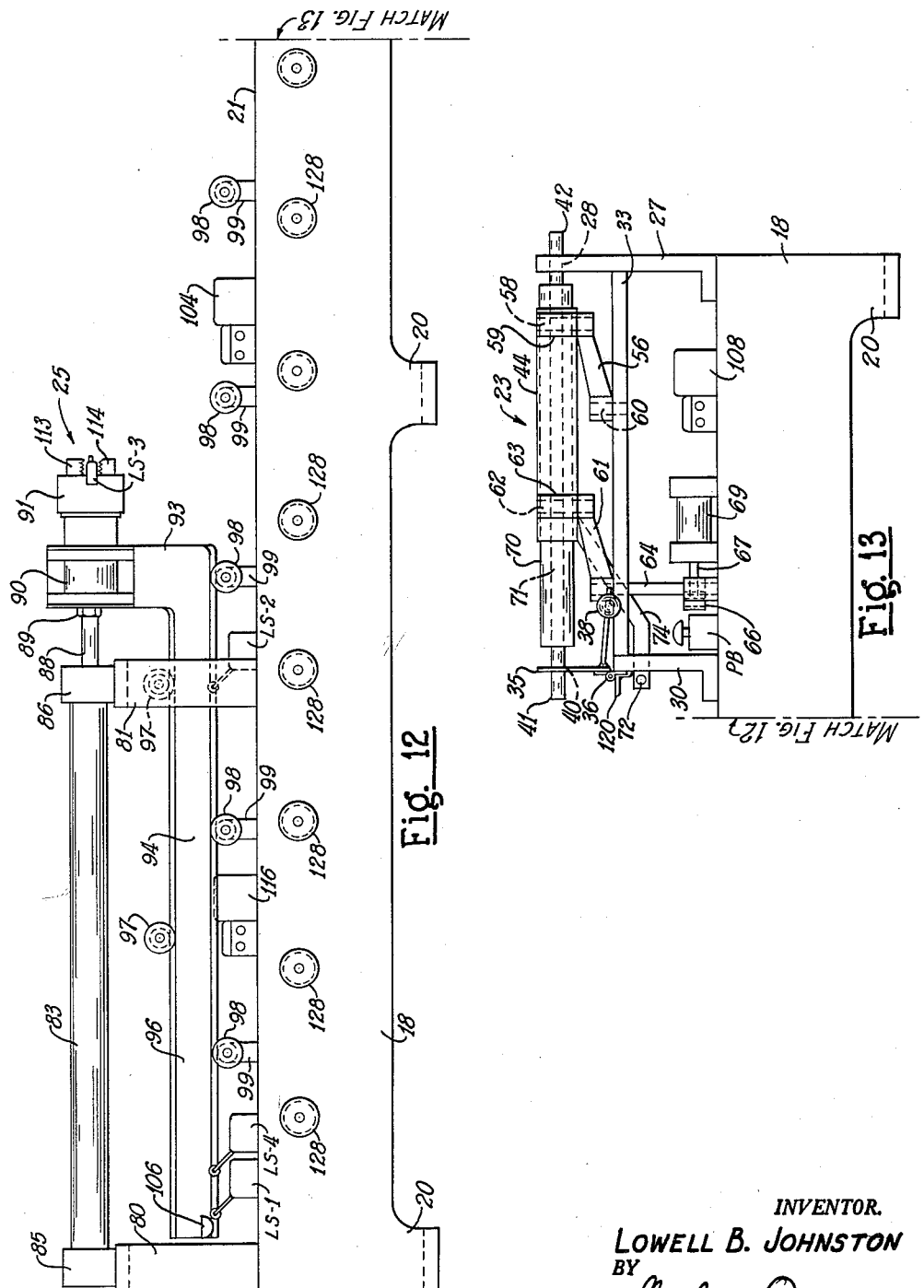

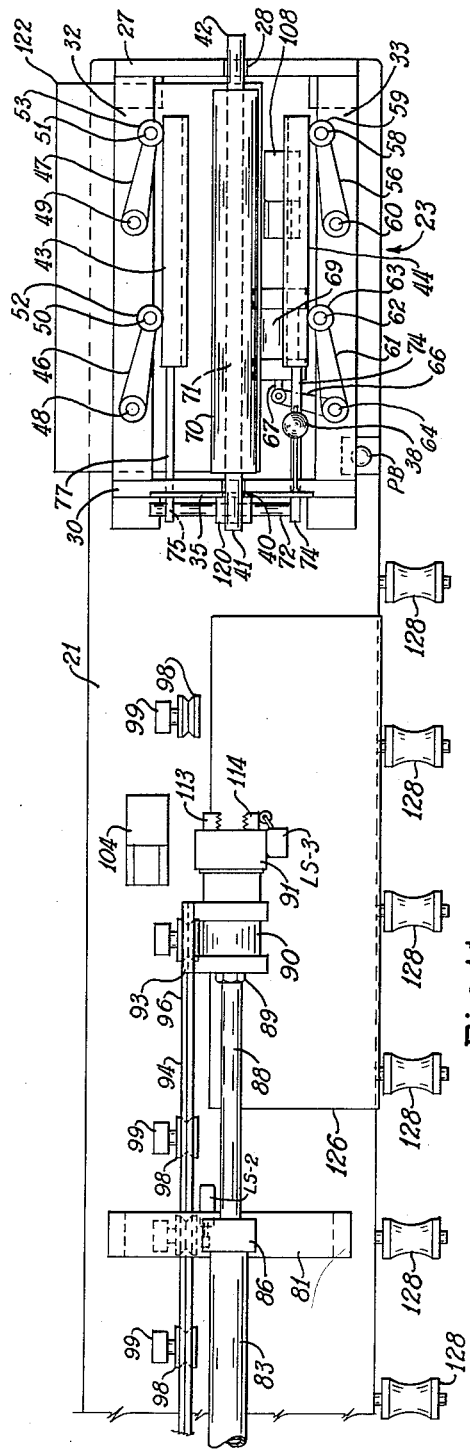

United States Patent Office 3,061,914
Patented Nov. 6, 1962

3,061,914
APPARATUS FOR WITHDRAWING MANDRELS FROM TUBULAR BODIES
Lowell B. Johnston, Newark, Ohio, assignor to Owens-Corning Fiberglas Corporation, a corporation of Delaware
Filed Nov. 24, 1958, Ser. No. 775,927
11 Claims. (Cl. 29—234)

This invention relates to apparatus for removing mandrels from tubular bodies which are of a crushable or deformable nature and has been found of special utility in the manufacture of cylindrical pipe insulating casings or independent self-insulating ducts of bonded fibers.

The fibers are usually of glass composition but may be produced from fusible rock or slag or be of some other organic or mineral base. The usual procedure followed in forming mineral fibers entails the attenuation of minute streams of the molten material with blasts of steam, air or combustion gases and collecting the fine filaments thus created, with an admixture of binder particles, upon a foraminous conveyor.

The binder constituent is generally thermosetting in nature. Resins of phenol formaldehyde, urea formaldehyde, melamines and polyesters are among the substances proven satisfactory.

For producing the tubular products to which this invention relates, the fibers of glass, most commonly preferred are drawn and gathered upon a conveyor in diameters between ten and thirty hundred thousandths of an inch and in lengths averaging no more than two or three inches.

Suction upon the under side of the foraminous conveyor is ordinarily employed to facilitate the deposit of the fibers with the binding agent, and the creation of a web of the fibers. The thickness of the web is determined mainly by the speed of movement of the conveyor and the fiber production rate. A web of the preferred fibrous glass stock may, for instance, be approximately one inch thick and have a density of one pound per cubic foot.

The binder impregnated web is customarily wound by hand or machine upon a mandrel of the diameter desired for the inner bore of the pipe casing or duct to be created with the winding taking the number of turns required to build up the wall thickness desired in the final product.

In this operation the original light, rather fluffy web is compacted and stretched to an extent where its density may be increased from four to ten times. Even with this densification the ultimate weight ranges up to no more than ten pounds per cubic foot and usually is around three and a half pounds. Accordingly, the final product has a high content of air distributed in the minute pockets of the fibrous mass. While having ample shape retaining capacity for its intended use, the tubular body does not have great tensile or compression strength.

The mandrels upon which the fibrous web is wound are customarily coated with a releasing agent such as carnauba wax to ease removal of the tubular products after heat has been applied to cure the binder and integrate the wound body in cylindrical form. In spite of the aid of such coating substances, difficulty is usually encountered in separating the cured products from the mandrels.

The heat of curing may liquefy the protective coating or otherwise so weaken its effectiveness that some of the binder composition reaches the mandrel and becomes adhered to its surface. Then too, the winding and compression of the web of fibrous glass around the mandrel makes it fit tightly thereagainst.

Numerous methods have been followed in removing the mandrel from the cured stock. These have included blocking the end of the tubular body and withdrawing the mandrel, and holding the mandrel in a fixed position while manually pulling the tubular casing therefrom. Grasping a casing by hand naturally impresses it irregularly and applies force to only limited areas. These procedures have either required excessive time, or resulted too frequently in deformation of the tubular casings.

It is the prime purpose of this invention to provide apparatus for quickly and without injury separating such crushable, porous casings from the mandrels upon which they are formed.

It is a further object of the invention to provide means for gripping the tubular bodies with only sufficient pressure to retain them while the mandrels are extracted.

Another object of the invention is the provision of apparatus which applies evenly distributed holding pressure against the bodies longitudinally thereof during the separating action.

These and other objects of the invention are attained through the use of parallel, elongated clamping members which are movable laterally against opposite sides of a casing, and the utilization of pressure developing means which impel the members against the sides of the casing with force proportional to that required to withdraw the mandrel.

A description of an apparatus embodying the invention follows, and illustrations of such apparatus are included in the accompanying drawings in which.

Figure 1:
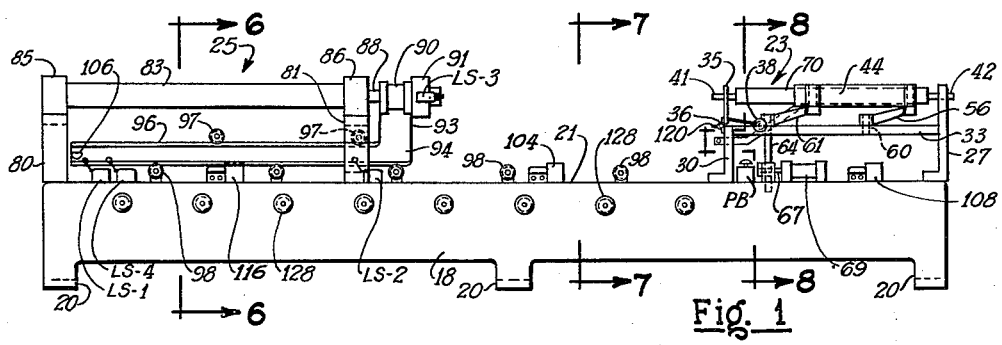
FIGURE 1 is a side elevation of an apparatus constituting one embodiment of this invention with the apparatus shown in starting position.
Figure 2:
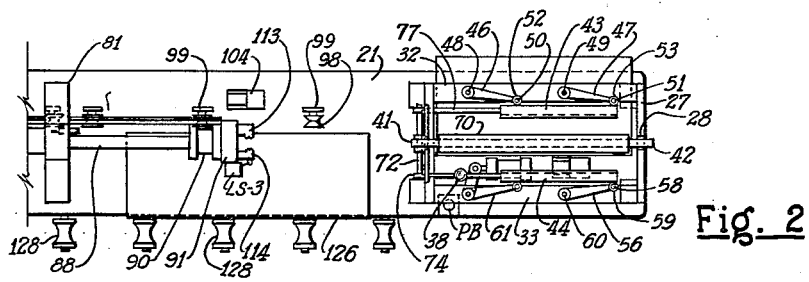
FIGURE 2 is a plan view of the major right hand portion of the apparatus of FIGURE 1, in which the apparatus is in the first phase of operation.
Figure 3:
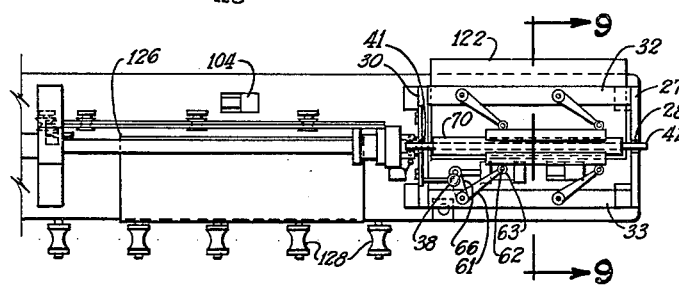
Figure 4:
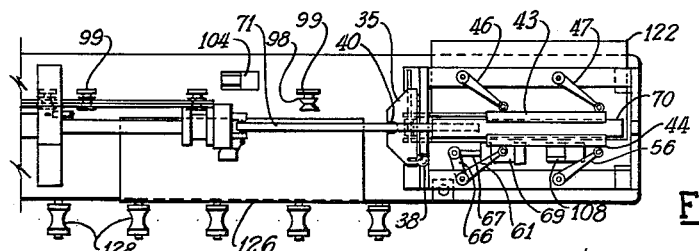
Figure 5:
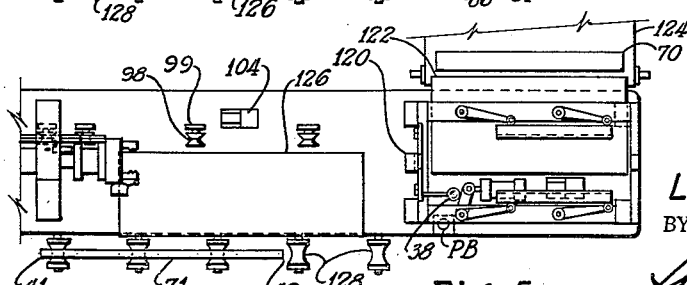
Figure 6:
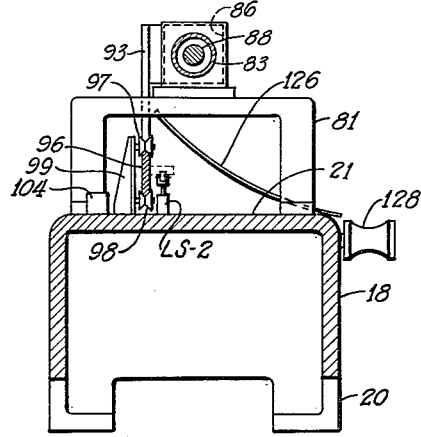
Figure 7:
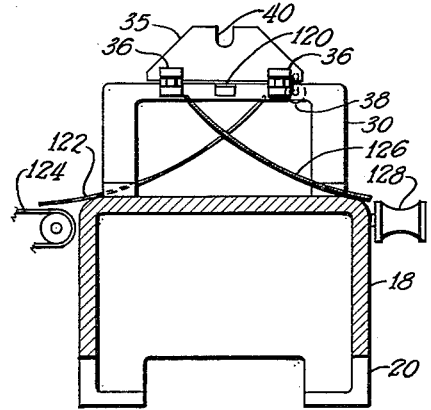
Figure 8:
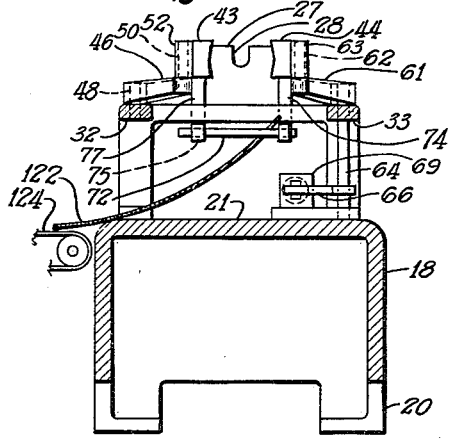
Figure 9:
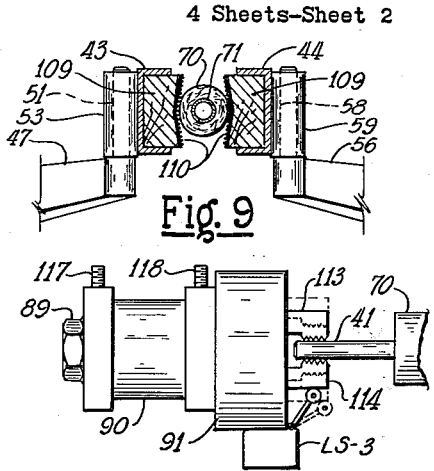
Figure 10:
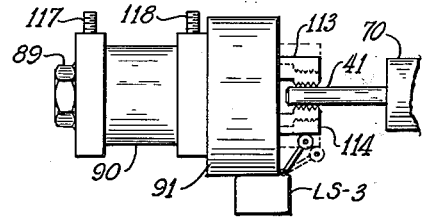
Figure 11:
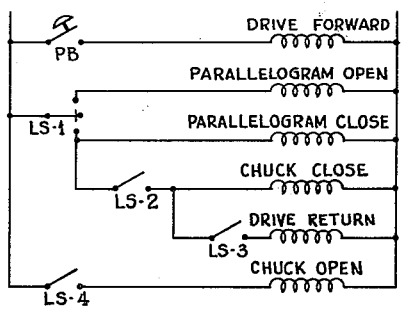

FIGURES 3, 4 and 5 present progressive stages of operation of the apparatus as shown in FIGURE 2; FIGURE 3 has the carriage in its most advanced position after the chuck jaws have seized the mandrel; in FIGURE 4, the carriage is being returned with the mandrel substantially withdrawn from the casing; and in FIGURE 5 the apparatus is back in starting position after release of the separated mandrel and casing;

FIGURE 6 is a somewhat enlarged section of the apparatus, with parts omitted, taken on the line 6—6 of FIGURE 1;

FIGURE 7 is another section of the apparatus, likewise enlarged with portions removed, taken on the line 7—7 of FIGURE 1;

FIGURE 8 is a section on the line 8—8 of FIGURE 1;

FIGURE 9 is an enlarged cross section of the pair of clamping bars for holding the tubular insulating units, taken on the line 9—9 of FIGURE 3;

FIGURE 10 is a large scale plan view of the chuck and air cylinder assembly, with the chuck jaws closed upon the end of a mandrel in the position of the apparatus as shown in FIGURE 3;

FIGURE 11 is a simplified diagram of an electrical circuit for the disclosed apparatus;

FIGURES 12 and 13 together comprise an enlargement of the side elevation of the apparatus as shown in FIGURE 1; and FIGURE 14 is an enlarged reproduction of the plan view of the apparatus presented in FIGURE 2.

Referring to the drawings in more detail, the apparatus of FIGURE 1, which is shown on an enlarged scale in FIGURES 12 and 13, includes an elongated base 18 standing on legs 20. The upper surface of the base 18 provides a platform area 21. On the right hand end of the platform 21, as viewed in FIGURE 1, is a receiving station 23 for mandrels carrying insulating casings, while at the left end of the platform, generally designated as 25, is actuating mechanism for withdrawing a mandrel from an insulating casing positioned in the receiving station 23.

As best seen in FIGURES 13 and 14 of the drawing, there is an upright end member 27 at the right end of the station 23. Cut downwardly in the center of the top edge of member 27 is a slot 28.

Spaced away from end member 27 longitudinally of platform 21 there is an arching bracket 30 of lesser height than member 27. Two flat side rails 32 and 33 connect end member 27 and the arching bracket 30. A plate 35 is hinged at 36 to the upper edge of bracket 30. The plate 35 is normally biased to an erect position by the counterweight 38 projecting laterally therefrom.

An upwardly open notch or slot 40 in plate 35 is horizontally, and longitudinally of the base, in line with the slot 28 in the end member 27. The two slotted elements are positioned a sufficient distance apart to permit the entry between them of a mandrel carrying an insulating casing arriving at the receiving station, with one shaft end 41 of the mandrel lodged in slot 40 and the opposite shaft end 42 disposed in slot 28.

Along opposite sides of a loaded mandrel suspended in slots 28 and 40 of end member 27 and plate 35 are clamping channel-bars 43 and 44. Each clamping bar is carried by a pair of co-acting, swingable arms.

The two arms 46 and 47 supporting clamping bar 43 are respectively pivotably mounted on studs 48 and 49 projecting upwardly from the flat side rail 32. The other end of arm 46 is connected to the clamping bar 43 by an integral upstanding pin 50 journaled in a bushing 52 fixed to the back of the bar. In the same manner arm 47 is joined to bar 43 by a pin 51 projecting upwardly from the arm and inserted within bushing 53 fastened to the back of the bar.

A supporting arm 56 for the other clamping bar 44 is connected therewith through an integral upright pin 58 journaled within a bushing 59 fixed to the back of the bar. At its other end arm 56 is pivotally mounted on a stud 60 projecting upwardly from the flat side rail 33.

The other arm 61 holding clamping bar 44 is joined thereto by a pin 62 turnably inserted in the bearing bushing 63 fixed to the bar. The opposite end of arm 61 has an integral rod 64 depending therefrom and extending down through a bore in rail 33. Secured to the lower end of rod 64 is a crank arm 66 pivotally connected to the outer end of the piston rod 67 projecting from air cylinder 69.

Through leftward movement of the piston within air cylinder 69 and consequential rotation of rod 64, the clamping bars 43 and 44 are driven toward each other into gripping relation with an insulating casing 70 on a mandrel 71 in the receiving station 23. Satisfactory action of cylinder 69 has been secured with forty pounds air pressure and with the cylinder having a one inch bore.

By reverse movement of the piston within cylinder 69 and rotation of rod 64 in the opposite direction the clamping bars are drawn apart for release of a casing and for providing space for the reception at the receiving station of the following casing-carrying mandrel.

The clamping bar 43 acts in unison with bar 44 in moving inwardly to grip an insulating casing and in moving outwardly to release the casing. This mutual action is secured through the guidance of the lateral rod 72 extending from leg 74 depending from bar 44. Rod 72 has a sliding fit in a cross bore 75 through the lower end of a similar leg 77 projecting downwardly from bar 43, as may be observed in FIGURE 8. A more complete description of the movement of clamping bars 43 and 44 will be given hereafter in connection with a review of the operation of the apparatus.

Reference will now be made to the elements of the mandrel withdrawing mechanism 25 located mainly upon the left end of the platform 21 of the apparatus as presented in FIGURE 1, and shown on an enlarged scale in FIGURE 12. Standing at the end of the platform is an inverted-U supporting member 80. A similar companion supporting element 81 is spaced therefrom longitudinally of the base 18, and is also in straddling relation to the center area of the platform as may be seen in FIGURE 6.

A large air cylinder 83 is suspended between supports 80 and 81 with its end caps 85 and 86 mounted on the supports. From the piston within cylinder 83 extends the piston rod 88. This is connected by the coupling nut 89 (see FIGURE 10) to the short air cylinder 90. The latter is operatively assembled with the aligned chuck 91.

The air cylinder 90 rides upon the upturned end 93 of a carriage 94. The main body of the carriage comprises a long narrow plate 96 with its lengthwise axis disposed horizontally and its main cross dimenion or breadth in a vertical plane.

The upper and lower edges of the plate 96 are outwardly peaked with a V contour to fit against upper and lower series, 97 and 98, of spaced grooved rollers. These rollers are mounted on the sides of a row of posts 99.

When the apparatus is set for the start of operations the chuck 91 and its motivating cylinder 90 are in their most withdrawn position away from the receiving station 23, and the jaws 113 and 114 of the chuck 91 are spread open. This is the condition of the apparatus as illustrated in FIGURES 1 and 12. Initially, the clamping bars 43 and 44 are spread apart in the manner shown in FIGURE 2. The bars are thus disposed in FIGURE 2 for illustrating purposes, but it should be noted that they would, in the course of operation of the apparatus, have been brought against the casing before the chuck 91 has reached the extended position shown in this figure.

With a casing 70 on a mandrel 71 in place at the receiving station 23, a manual starting switch PB, located at the station, is actuated by an attendant. Through an intermediate relay this switch activates the four-way solenoid valve 104 to admit piston-propelling air, at a pressure which may be around forty pounds per square inch, into the left end (as viewed in FIGURE 1) of cylinder 83. The piston within cylinder 83 is thus driven to the right forcing piston rod 88, the cylinder 90 and chuck 91 toward the receiving station 23.

The carriage 94 moves in supporting relation with the cylinder 90 and in so doing first brings cam 106 mounted on the carriage in tripping contact with the limit switch LS–1. The tripping of switch LS–1 through conventional electrical elements actuates the four-way solenoid valve 108 to deliver air to the right hand end of cylinder 69. This moves the piston within cylinder 69 to the left and outwardly projects piston rod 67.

Through the outward projection of piston rod 67 from cylinder 64 the vertical rod 64 is rotated counter clockwise in looking downwardly upon the apparatus as shown in FIGURE 8. This swings arm 61 in a like direction moving channel bar 44 inwardly against the casing 70 to be separated from its carrying mandrel.

As the channel bar 44 shifts toward the casing it is maintained parallel thereto through the inherent effect of the elongated parallelogram, the ends of which are formed by the arms 56 and 61 of equal length, the long sides of which are the equal lines connecting on one side the points of connection of arms 56 and 61 with clamping bar 44 and on the other side the centers upon which the other ends of the arms 56 and 61 are pivoted in their mounting on side rail 33.

The inward shifting of channel clamping bar 44 is accompanied by a slight longitudinal movement to the left. This lengthwise travel is transferred to channel clamping bar 43 by lateral rod 72 extending from leg 74 of bar 44 and journaled in the bore 75 of leg 77 depending from bar 43. To assure effective transfer of the motion of bar 44 to bar 43, it may be desirable to have a second rod and bore engagement between them such as that provided by rod 72 and bore 75.

Through the similar parallelogram type of mounting of bar 43 the longitudinal travel thereof, matching that of bar 44, also causes bar 43 to approach the casing to the same degree that bar 44 is moved toward the casing and to remain in parallel relation thereto.

The clamping bars 43 and 44 are thus pressed against opposite sides of the casing, assuming the position shown in FIGURE 3, and this thrust is evenly distributed along the casing due to the constant parallel relation of the channel bars therewith.

The gripping pressure of the clamping bars compresses the insulating casing uniformly from end to end and the action of one bar is in exact opposition to that of the other bar. The resulting deformation is only temporary in nature due to the natural resilience of the bonded fibrous mass. This distributed compression is in considerable contrast to the localized pressure applications previously utilized which were strongly inclined to prod into the body of insulation splitting the stock and pulling out of place clumps of the binded fibers.

In order to reduce the chance of injury to the casing from the seizing contact of bars 43 and 44 wooden inserts 109 are fixed within these channel bars. The inserts have facings of open V or arching section which have rough-surfaced coverings such as the alligator belting 110 indicated in FIGURE 9. The facings are shaped to accommodate casings of various diameters ranging upwardly in size to an outside diameter of six and one half inches from the small model shown in FIGURE 9 having an outside diameter of only two and one third inches.

With the casing held by the bars 43 and 44, the chuck 91 moves forwardly upon carriage 94 under the drive of the piston of cylinder 83 until the piston reaches the end of the cylinder where it is cushioned by semi-locked air to a stop. The termination is prearranged to halt the chuck 91 with its open jaws 113 and 114 over the end shaft 41 of the mandrel without any actual contact with the mandrel. It is important to avoid any jarring meeting of the carriage elements and the mandrel, as the rapid repeated cycling of the apparatus is possible only through maintaining the exact positioning of the mandrels and precise control of the approach of the carriage. Should there be a need for an easily altered stop device, as with mandrels of different lengths, an accessible shock absorbing snubber could be adjustably positioned to abut against the carriage or the chuck to arrest the movement at the desired spot.

The limit switch LS-2 is tripped by cam 106 on the carriage 94, as the carriage is halted, to actuate the solenoid valve 116 to supply air to the chuck cylinder 90. Incidentally, air lines from valve 116 to cylinder 90 must be looped and flexible or otherwise extensible to follow the carriage travel. Actuation of the piston in cylinder 90 closes the jaws 113 and 114 of the chuck upon end shaft 41 of the mandrel as shown in FIGURES 3 and 10.

In closing, the jaw 114 releases limit switch LS-3, which is carried on the chuck as best seen in FIGURE 10. Solenoid valve 104 is reversed by switch LS-3 to send air to the right end of cylinder 83 and against the piston therein to start the withdrawal of the piston rod 88 and the chuck 91 fastened thereto away from the receiving station 23. Slight delay in the reversing travel of the chuck, to assure prior tight seizure of shaft 41 by the jaws, may be secured through a metering valve in the air line to cylinder 83.

As the steady pull of the chuck 91 is applied to the mandrel 71 and starts its withdrawal from the insulating casing 70, the frictional contact between the mandrel and the casing 70 transmits a like longitudinal drag or pull to the casing. Through this force the casing tends to follow the mandrel and in so doing to even a slight degree carries the clamping bars 43 and 44 with it. Such accompanying movement of the bars swings the arms 46, 47, 56 and 61 inwardly and the arms thus impress the bars proportionately more tightly against the sides of the casing.

Any longitudinal shifting of the casing is accordingly directly and immediately balanced by a firmer grip of the bars thereon. In this manner sufficient pressure, but no more than is necessary, is applied against the casing to retain it in the receiving station.

Ordinarily it requires a greater pulling force to start the mandrel movement out of the casing and this results in an initially tighter hold of the casing by the clamping bars. After this primary higher resistance the mandrel withdrawal becomes easier and in reaction thereto the gripping pressure of the bars slackens proportionately.

For casings of large dimensions the mandrel 71 will have a center drum section of greater diameter than the end shafts 41 and 42. The latter are preferably of a uniform size for receipt within a standard width for the slots 28 and 40 in the upright end member 27 and the plate 35.

The hinged arrangement of plate 35 permits it to be swung downwardly, as shown in FIGURE 4, by abutment of an enlarged drum section and to so let a mandrel so constructed pass over the plate. A stop member 120 (see FIGURES 5 and 14) prevents tipping of the plate 35 beyond a point where the counterweight 38 would no longer be effective in bringing the plate back to its usual upright position.

When the carriage 94 carrying the mandrel 71 in the jaws of the chuck 91 approaches the end of its backward travel the cam 106 trips the limit switch LS-4, which was by-passed on the forward movement of the carriage. Actuation of switch LS-4 energizes a reversal of the solenoid valve 116 and air is delivered to chuck cylinder 90 to open jaws 113 and 114. This action may be timed to take place as the returning carriage movement is terminated, by a suitable metering or choking valve in the air line to the cylinder 90.

In the final stage of this reciprocation of the carriage, cam 106 strikes limit switch LS-1 and thus actuates solenoid valve 108 and cylinder 69 to swing the clamping bars 43 and 44 away from the casing 70 from which the mandrel 71 has been extracted.

Accordingly, at about the same instant, the casing is released by the bars and the mandrel is released by chuck jaws. The casing then drops down the inclined chute 122 by which it is delivered to the conveyor 124 as shown in FIGURE 5. The casing may be transported by conveyor 124 to subsequent trimming, slicing and packaging stations.

The mandrel 71 falls upon the sloping chute 126 and is directed thereby upon the spool shaped rollers 128 which may be power driven to deliver the mandrel for repeated use in the molding and binder curing of another insulating casing.

The cycle of operation of the apparatus is thus completed and the apparatus is ready to receive the next mandrel carrying an insulating casing from the preceding curing process. The functioning of the subject apparatus, as may be judged from the foregoing, is very rapid and is adapted to handle a production of insulating casings as high as twenty to twenty five per minute.

The sequence of the operating steps of the apparatus is indicated by the simplified electrical diagram of FIGURE 11. There is first the closing of the manual switch PB which starts the forward movement of the carriage 94. The cam 106 mounted on the carriage then trips switch LS-1 to bring the clamping bars in their parallelogram arrangement in gripping contact with an insulating casing.

As the carriage reaches the finish of its forward movement switch LS-2 is actuated to close the jaws 113 and 114 of the chuck 91 over the shaft end 41 of the mandrel. In closing, jaw 114 releases switch LS-3 causing a flow of air to cylinder 83 to return the carriage. In the final stage of the backward travel of the carriage switches LS-4 and LS-1 are actuated by cam 106 to respectively open the jaws of the chuck to release the mandrel and to spread the bars 43 and 44 way from the casing and permit it to fall upon the discharge chute 122.

It is believed that those conversant with the art may perceive without difficulty that the apparatus herein presented meets the objects of the invention in being capable of quickly and without injury separating crushable casings from mandrels and doing so by gripping the casings with controlled minimum pressure applied evenly and longitudinally against the casings, with the pressure proportional to the pulling force exerted on the mandrel.

Numerous modifications and substitutions may, of course, be made in the disclosed apparatus within the purview of the invention. As an example, hydraulically motivated pistons would be quite as effective as those of pneumatic operation selected for disclosure. For the pistons having a short stroke electrical solenoids could also be utilized; in addition, motor driven mechanisms could be devised for the various movements involved.

While stop members would be required to keep the clamping bars roughly parallel in their retracted positions, a single pivotal arm for each bar could be used to impel the bar toward a casing and to translate longitudinal pull thereon to a proportionally increased retaining thrust of the bar against the casing. A clamping bar held pivotably on a single arm would align itself to lie flat against the casing when brought in contact therewith by the swinging arm.

The disclosed arrangement of two opposed clamping bars is considered fully adequate in retaining without disfiguring most molded fibrous casings while the mandrels on which they are formed are withdrawn. However, should there be need of having the clamping members grip a larger portion of the peripheral surface of a casing to avoid injury thereto during separation of the casing from the mandrel, three or four clamping bars may be utilized in place of the single pair shown herein.

In case three are used they would preferably be placed one hundred and twenty degrees apart around the casing and their movements would be synchronized in the same manner as described in the foregoing by rods, such as rod 72, extending from an air motivated bar slidingly fitted through bores in the structures of the other bars.

With four clamping bars spaced ninety degrees from each other, one of each opposing pair should be air actuated with the movement transmitted to the opposite bar through the rod and bore arrangement.

These combinations of a greater number of bars would, of course, be more complicated and therefor ordinarily undesirable. For handling a difficult separation problem in regard to a specific size of casing the recommended pair of bars could be designed with a facing area of a shape and extent to abut nearly the full periphery of the casing. The necessity of increasing the number of clamping members would thus be avoided.

While it is believed that the precise stopping of the carriage movement is best secured with smooth and trouble-free functioning by positioning of the driving cylinder and using a cylinder with an end dash pot design, other independent arresting devices utilizing springs or rubber cushioning may be substituted therefor. Some leeway is preferably provided in the stopping point of the carriage and for slight longitudinal differences in the mandrel positioning by having the jaws of the chuck considerably longer than required for a tight hold of the mandrel shaft. This permits different degrees of entry of the shaft between the open jaws.

These variations as well as others equally obvious in nature are considered to be within the scope of the invention as delineated in the following claims.

I claim:

1. Apparatus for removing a crushable, tubular casing from a mandrel upon which it has been formed and to which it is frictionally adhered including clamping bars for engaging and holding the casing, mechanism for seizing an end of the mandrel and pulling it axially from the casing, and mounting elements for the clamping bars, said elements adapted to respond to any tendency of the casing to follow the axial withdrawal of the mandrel due to its frictional adherence thereto by pressing the clamping arms into sufficiently tighter engagement with the casing to counteract such tendency, and means distinct from the clamping bars first receiving the mandrel and supporting the mandrel and the tubular casing thereon in a definite axial position, said means distinct from the clamping bars comprising two opposed upright members each with an upwardly open slot adapted to receive an end of the mandrel.

2. Apparatus for removing a crushable, tubular casing from a mandrel upon which it has been formed and to which it is frictionally adhered, comprising a supporting base, a station on the base, spaced upright elements within the station having upwardly open slots for receiving the ends of the mandrel and therethrough holding in a definite axial position a mandrel and a casing carried on the mandrel, spaced elongated clamping bars disposed oppositely along and parallel to a casing on a mandrel in the station, mounting elements for the bars adapted to maintain them in parallel relation to the casing while permitting lateral movement of the bars toward each other and against different sides of the casing, means moving the bars laterally into gripping contact with the casing, and mechanism adapted to seize an exposed end of the mandrel on which the casing is carried and to withdraw the mandrel axially from the casing while the latter is gripped by the bars.

3. Apparatus according to claim 2 in which the mounting elements include for each bar a pair of arms of equal length swingable at their outer ends upon fixed points equidistant from the longitudinal axis of the casing, said arms having pivotal connections at their inner ends with the bar, the distance between the fixed points being equal to the distance between the pivotal connections with the bar whereby the arms constitute the ends of a parallelogram of which lines between the fixed points and the pivotal connections define opposite sides, the arms being angled away from the end of the mandrel seized by the withdrawing mechanism, and the said means moving the bars laterally into gripping contact with the casing doing so by acting to swing the arms toward a more perpendicular position relative to the bars and thus thrusting the bars inwardly toward the casing, while also moving the bars slightly longitudinally of the casing, said means moving the bars laterally acting directly to swing one arm of one bar and including a rod from said one bar passing through a bore associated with the other bar which transmits the resulting slight longitudinal movement of the one bar to the other bar and thereby swings the arms of the other bar.

4. Apparatus for removing a crushable, tubular casing from a mandrel upon which it has been formed comprising a supporting base, a station on the base, spaced elements within the station engaging the ends of a mandrel and therethrough holding in a definite axial position a mandrel and a casing carried on the mandrel, a pair of spaced elongated clamping bars disposed oppositely along and parallel to a casing on a mandrel in the station, mounting elements for the bars adapted to permit lateral movement thereof toward each other and against opposite sides of the casing, means moving the bars into gripping contact with the casing, and mechanism adapted to seize an exposed end of the mandrel on which the casing is carried and pulling the mandrel axially from the casing while the latter is gripped by the bars, said mounting elements for the bars adapted to increase the gripping action of the bars upon the casing in proportion to the amount of resistance encountered by the mechanism in pulling the mandrel axially from the casing, said means moving the bars into gripping contact with the casing acting directly upon one of the bars and including a rod from said bar sliding in a bore associated with the other bar by which the gripping movement is transferred to the other bar.

5. Apparatus for separating a tubular casing from a mandrel upon which it has been formed and to which it is frictionally adhered, including a station for receiving and holding in a definite position a mandrel and a casing carried on the mandrel, clamps adapted to grip the casing received with a mandrel in the station, a carriage reciprocable toward and away from said station, a chuck mounted on the carriage and movable therewith axially in line with the mandrel, jaws on the chuck radially and outwardly movable to an open position, a withdrawn position of the carriage wherein the chuck is spaced from the mandrel a distance at least equal to the length of the mandrel, an actuator advancing the carriage toward the mandrel, a stopping device terminating the advancing movement of the carriage with the open jaws of the chuck over the end of the mandrel, means reactive to the termination of the advancing movement of the carriage to cause the jaws to close and seize the end of the mandrel and to initiate the return of the carriage to its withdrawn position, said return of the carriage drawing the mandrel from the casing, the latter being retained in the station by the clamps, and means motivated by the return of the carriage opening the jaws and freeing the mandrel and releasing the casing from the grip of the clamps.

6. Apparatus according to claim 5 in which the means reactive to the termination of the advancing movement of the carriage to cause the jaws to close includes a limit switch tripped by the carriage, a solenoid valve actuated by the limit switch and an air piston operatively associated through the chuck with the jaws, said piston being motivated by air supplied through the solenoid valve.

7. Apparatus according to claim 5 in which the means reactive to the termination of the advancing movement of the carriage to initiate the return of the carriage includes a limit switch carried on the chuck and tripped by the closing of the jaws of the chuck, a solenoid valve actuated by the limit switch, and an air piston in driving association with the carriage, said piston being motivated by air supplied through the solenoid valve.

8. Apparatus for removing a tubular casing from a mandrel upon which it has been formed and to which it is frictionally attached including a station for receiving and holding in a definite position a mandrel and a casing carried on the mandrel, a bracket in the station having an upwardly open slot in which one end of the mandrel is lodged, a tiltable member in the station, normally disposed in an upright position, having a slot in its upper edge in which the other end of the mandrel is lodged, clamping bars movable into gripping contact with the casing on a mandrel in the station, means for moving the bars into gripping contact with the casing, a chuck mounted for reciprocation in line with the axis of the mandrel from the end of the mandrel supported in the tiltable member, jaws operably associated with the chuck, means for bringing the chuck adjacent the said end of the mandrel and causing the jaws to seize said end, and means for retracting the chuck and thereby withdrawing the mandrel from the casing gripped by the clamping bars, said tiltable member being tipped downwardly out of the way of the mandrel by the mandrel should the mandrel have a center portion too large to pass through the slot in the member.

9. Apparatus for removing a tubular casing from a mandrel upon which it has been formed and to which it is frictionally attached, including a supporting base, a station on the base adapted to receive and hold in a definite position a mandrel and a casing carried on the mandrel, clamping bars disposed oppositely along and parallel to a casing on a mandrel in the station, mounting elements for the bars adapted to maintain them in parallel relation to the casing while permitting lateral movement of the bars toward each other and against different sides of the casing, means acting under fluid pressure moving the bars laterally into gripping contact with the casing, a carriage reciprocable toward and away from said station, a chuck mounted on the carriage and movable therewith axially in line with the mandrel, jaws on the chuck expansible to an open position, means opening said jaws, a withdrawn position of the carriage wherein the chuck is spaced from the mandrel a distance at least equal to the length of the mandrel, a fluid driven piston advancing the carriage toward the mandrel, a stop terminating the advancing movement of the carriage with the open jaws of the chuck over the end of the mandrel, means activated by the termination of the advancing movement of the carriage closing the jaws upon the end of the mandrel and reversing the fluid driven piston to return the carriage to its withdrawn position, said return of the carriage drawing the mandrel from the casting, the casing being retained in the station by the clamping bars, and means motivated by the return of the carriage opening the jaws to free the mandrel and retracting the clamping bars to release the casing.

10. An apparatus according to claim 9 in which the means acting under fluid pressure moving the bars laterally includes an air driven piston and a cylinder within which the piston is lodged, and there is a solenoid valve controlling the flow of air to the cylinder, the means for opening said jaws includes an air cylinder and a piston within the cylinder, said piston being operably associated with the chuck, and there is a solenoid valve controlling the flow of air to said last mentioned air cylinder, and there is an additional solenoid valve controlling fluid flow to the piston advancing the carriage.

11. An apparatus according to claim 10 in which there are limit switches electrically connected to the various solenoid valves, said switches being located for successive tripping during the cycle of operation of the apparatus.

References Cited in the file of this patent
UNITED STATES PATENTS

| | | |
|---|---|---|
| 201,096 | Cowles | Mar. 12, 1878 |
| 1,807,360 | Wehr | May 26, 1931 |
| 2,683,019 | Saunders | July 6, 1954 |